(12) United States Patent
Guerreri et al.

(10) Patent No.: US 11,520,051 B2
(45) Date of Patent: Dec. 6, 2022

(54) SYSTEM AND METHOD FOR IDENTIFYING ROTARY WING AIRCRAFT

(71) Applicant: Electronic Warfare associates, Inc., Herndon, VA (US)

(72) Inventors: Carl Guerreri, Manassas, VA (US); Oscar Fahrenfeld, Lawrence, NJ (US); Jason Pizzillo, Manassas, VA (US); Tom Bonazza, Fairmont, WV (US); Deborah McNally, Nokesville, VA (US)

(73) Assignee: Electronic Warfare associates, Inc., Herndon, VA (US)

( * ) Notice: Subject to any disclaimer, the term of this patent is extended or adjusted under 35 U.S.C. 154(b) by 341 days.

(21) Appl. No.: 16/654,529

(22) Filed: Oct. 16, 2019

(65) Prior Publication Data

US 2020/0363529 A1    Nov. 19, 2020

Related U.S. Application Data

(60) Provisional application No. 62/849,532, filed on May 17, 2019.

(51) Int. Cl.
*G01S 17/74* (2006.01)
*G01S 7/41* (2006.01)
*G01S 13/78* (2006.01)

(52) U.S. Cl.
CPC ............. *G01S 17/74* (2013.01); *G01S 7/412* (2013.01); *G01S 13/78* (2013.01)

(58) Field of Classification Search
CPC ........... G01S 17/74; G01S 7/412; G01S 13/78
See application file for complete search history.

(56) References Cited

U.S. PATENT DOCUMENTS

| | | | |
|---|---|---|---|
| 7,019,682 B1* | 3/2006 | Louberg | G01S 7/03 342/26 B |
| 9,950,791 B2* | 4/2018 | Blomberg | B64F 1/368 |
| 2013/0285847 A1* | 10/2013 | Ward | G01S 13/91 342/90 |
| 2015/0159632 A1* | 6/2015 | Vangen | F03D 7/04 416/61 |
| 2015/0302858 A1* | 10/2015 | Hearing | G10L 25/51 381/58 |
| 2017/0285158 A1* | 10/2017 | Halbert | G01S 7/414 |
| 2018/0011169 A1* | 1/2018 | Nakayama | G01S 13/42 |
| 2019/0129006 A1* | 5/2019 | Harman | G01S 13/422 |

* cited by examiner

*Primary Examiner* — Marcus E Windrich
(74) *Attorney, Agent, or Firm* — DLA Piper LLP US

(57) ABSTRACT

A system and method for detecting a rotary wing aircraft. A return electromagnetic signal, reflected by a rotary wing aircraft, is received through an electromagnetic signal detection apparatus. The aircraft includes a plurality of propeller blades attached to at least one motor. At least one propeller blade has at least one portion with a reflectivity different from other portions. A first time series data of the return electromagnetic signal is received. A second time series data is determined based on the first time series data and a predefined threshold. A characteristic of the second time series data is used to determine whether it corresponds to the known aircraft.

44 Claims, 15 Drawing Sheets

800

↓

DETERMINE A SET OF DOPPLER FREQUENCIES OF A SECOND TIME SERIES DATA AND RELATIVE RELATIONSHIPS BETWEEN THE SET OF DOPPLER FREQUENCIES — 802

↓

DETERMINE WHETHER THE RELATIVE RELATIONSHIPS BETWEEN THE SET OF DOPPLER FREQUENCIES MATCH PREDETERMINED RELATIONSHIPS ASSOCIATED WITH THE SET OF PREDETERMINED FLASHES — 804

↓

IN RESPONSE TO DETERMINING A MATCH, IDENTIFY THE AIRCRAFT — 406

SYSTEM AND METHOD FOR IDENTIFYING ROTARY WING AIRCRAFT

CROSS REFERENCE TO RELATION APPLICATION

This application claims the benefit of U.S. Provisional Patent Application No. 62/849,532, filed May 17, 2019, which is incorporated by reference in its entirety.

BACKGROUND

The present disclosure relates to rotary wing aircraft, and more specifically to a system and method for identifying rotary wing aircraft associated with an entity.

Rotary wing aircraft are widely used by a large number of entities in surveillance, reconnaissance, aerial photography, rescue efforts and other exploration tasks for military and civilian purposes. It is necessary to have a reliable and efficient solution to easily distinguish between rotary wing aircraft associating with one entity and those associated with others, thereby insuring that any action with regard to a particular rotary wing aircraft is appropriate.

In an exemplary embodiment of the present disclosure, a system and method for identifying a rotary wing aircraft, includes an electromagnetic signal detection apparatus. The apparatus includes a receiver configured to receive a return electromagnetic signal reflected by the rotary wing aircraft in response to a transmission of the electromagnetic signal. The receiver may be included in a transceiver which both emits an electromagnetic signal and receives the reflected electromagnetic signal. The rotary wing aircraft includes a plurality of propeller blades attached to a motor, at least one propeller blade having at least one portion with a reflectivity different from other portions. A processor in communication with the electromagnetic signal detection apparatus is configured to: receive a first time series data indicative of the return electromagnetic signal; determine, based on the first time series data, a second time series data having a value deviating from a predefined normal return threshold; determine a characteristic of the second time series data; and determine whether the characteristic of the second time series data corresponds to the known rotary wing aircraft.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Exemplary embodiments of this disclosure are illustrated by way of an example and not limited in the figures of the accompanying drawings, in which like references indicate similar elements.

DETAILED DESCRIPTION

Figure 1:
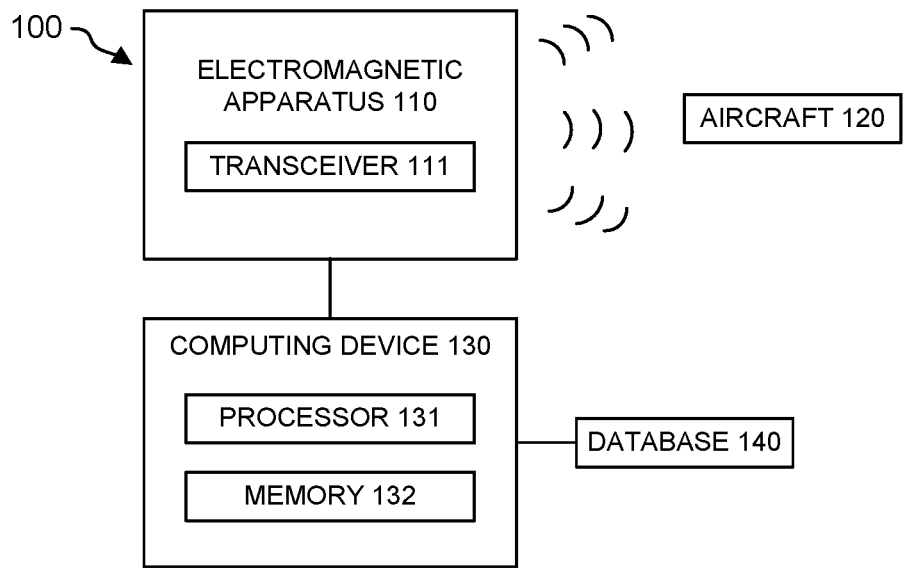
FIG. 1 is a block diagram illustrating an example system suitable for an electromagnetic detection apparatus interacting with a rotary wing aircraft according to some exemplary embodiments of the present disclosure.

Various example embodiments of the present disclosure will be described in detail below with reference to the accompanying drawings. Throughout the specification, like reference numerals denote like elements having the same or similar functions. Different reference numbers may be used to refer to different, same, or similar parts. While specific implementations and example embodiments are described, it should be understood that this is done for illustration purposes only. Other components and configurations may be used without parting from the spirit and scope of the disclosure, and can be implemented in combinations of the variations provided. These variations shall be described herein as the various embodiments are set forth.

The present disclosure relates to systems and methods of analyzing electromagnetic energy reflected by a rotary wing aircraft to identify whether the rotary wing aircraft is associated with an entity such that the rotary wing aircraft may be distinguished from other unknown rotary wing aircraft. A rotary wing aircraft may be a manned aircraft or an unmanned aircraft, such as an unmanned aerial vehicle (UAV).

The present disclosure describes a typical electromagnetic energy detection apparatus to generate and emit an electromagnetic signal to a rotary wing aircraft navigating region. At least one blade of the rotary wing aircraft may have at least one portion with a reflectivity different from other portions. The portion with different reflectivity may have an enhanced reflectivity or a decreased reflectivity compared to the other potions. Therefore, the electromagnetic energy detection apparatus may observe and detect a return of a signal reflected by the blade of the rotary wing aircraft. The signal generated by the portion having a reflectivity different from other portions may be greater or less than a predefined normal return reflective threshold. etc. In some embodiments, a normal return reflective threshold may be used to obtain the return signal caused by one portion with a reflectivity different from other portions.

Embodiments of the present disclosure may provide a solution to identify a particular rotary wing aircraft not only by the number and timing of the reflections of portions having reflectivity different from other portions but by the number of distinct Doppler returns observed and by their relative positions in the spectrum of the returned signal. For example, by analyzing the periodic reflections associated with the portions having reflectivity different from other portions in time domain, the portions having reflectivity different from other portions and covered on the same place of different blades of an aircraft can be identified as pulses to be compared with the stored pattern of portions having reflectivity different from other portions. By analyzing the periodic reflections associated the portions having reflectivity different from other portions in frequency domain, the pattern of portions having different reflectivity covered on the different places on the same blade of an aircraft can be identified and compared with relative relationships of the stored pattern of portions having different reflectivity. The stored pattern of portions having reflectivity may be an order of pulses associated with portions having different reflectivity. By analyzing the returned reflections in time and frequency domains, the system may identify an aircraft corresponding to a known aircraft of an entity and distinguish the rotary wing aircraft from unknown rotary wing aircraft.

In some embodiments, the term of "order of pulses" may describe a signal generated from the reflections including from portions of one or more blades having different reflectivity than other portions. In some embodiments, a pattern of different reflective portions may represent a sequence of enhanced reflective portions coated on different places or areas on one rotary blade attached to a rotary wing aircraft motor. In some embodiments, an order of pulses in a return signal may represent a sequence of portions having different reflectivity coated or embedded on the same place or area of different rotary blades attached to a rotary wing aircraft motor. In some embodiments, an order of pulses in a return signal may represent a first sequence of portions having different reflectivity coated on one rotary blade combined with other sequences of portions having different reflectivity coated on other rotary blades attached to the same motor.

Embodiments of the present disclosure may be applied to any type of rotary wing aircraft, including quadcopters, octocopters, etc.

Based on the predetermined order of pulses corresponding to combinations of portions having reflectivity different from other portions on the rotary blades of a rotary wing aircraft, new order of pulses associated with portions having different reflectivity may be established quickly and easily for rotary wing aircraft of a particular entity, which may provide a unique solution to identify known rotary wing aircraft of one or more known entities or distinguish known rotary wing aircraft from other unknown rotary wing aircraft.

Embodiments of the present disclosure provide unique and inventive solutions for identifying rotary wing aircraft navigating in a particular area. The solution may be used in various environment, such as personal, commercial, or military applications, to facilitate rotary wing aircraft identification and improve rotary wing aircraft safety operations.

FIG. 1 is a block diagram illustrating an exemplary system 100 according to some exemplary embodiments. The exemplary system 100 may include electromagnetic signal detection apparatus 110, rotary wing aircraft 120, computing device 130 and database 140. Electromagnetic signal detection apparatus 110 may be a processor-controlled equipment and configured to identify rotary wing aircraft and distinguish friendly and known rotary wing aircraft from other unknown rotary wing aircraft.

Electromagnetic signal detection system 110 may be any type of radars or other detection devices, such as a Doppler radar LIDAR, electro-optical device, etc. In some embodiments, electromagnetic signal detection apparatus 110 may include a transceiver 111 configured to generate and emit a beam of electromagnetic waves in an aircraft navigation region where a plurality of aircraft may be allowed to fly. Electromagnetic signal detection system 110 may include one more antennas and sensors configured to receive and detect electromagnetic energy reflected by one or more aircraft and to convert the reflected electromagnetic signals into time serial electronic data. Transceiver 111 may transmit the time serial electronic data to computing device 130 for processing and analyzing the received data. Computing device 130 may determine whether the aircraft belongs to a known entity or an unknown entity. Transceiver 111 may include various sensors to determine the range, angle, or velocity of an aircraft. Electromagnetic signal detecting device 110 may be coupled with computing device 130 or in communication with computing device 130 through a network. Instead of transceiver 111, a receiver may be used to detect the reflected electromagnetic originating from a separate source.

Computing device 130 may include processor 131 coupled to electromagnetic signal detection apparatus 110 for receiving and processing data based on programs, applications, or other units of code instructions configured to be executed by processor 131. Computing device 130 may be configured to control transceiver 111 of the electromagnetic signal detecting device 110 to generate and transmit a beam of electromagnetic waves to a navigation region (e.g., a service coverage area) where a plurality of aircraft may generally navigate. Computing device 130 may receive and analyze the data from the transceiver 111 to obtain a plurality of observable characteristics of the electronic signals associated with one or more aircraft. Computing device 130 may be configured to compare observable characteristics of the electronic signals with predetermined characteristics associated with known aircraft to determine whether an aircraft is associated with a known entity.

Figure 2A:
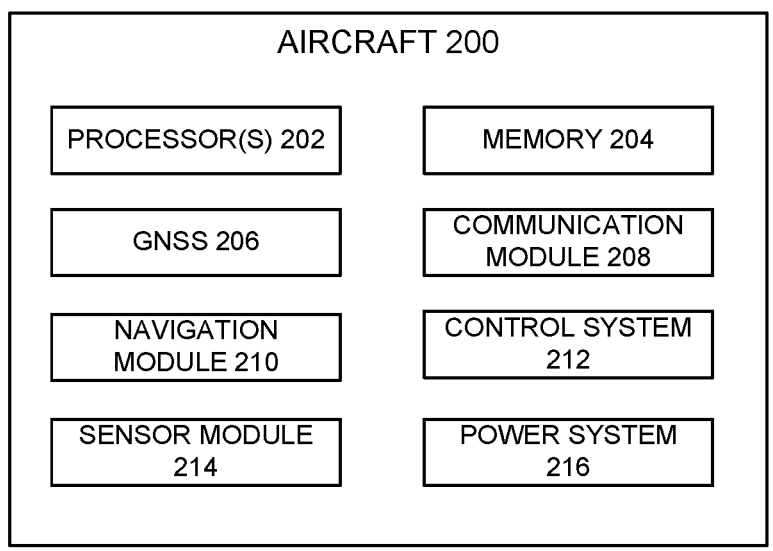
FIG. 2A is a block diagram illustrating an example rotary wing aircraft according to some embodiments.

As illustrated in FIG. 2A, a rotary wing aircraft 200 may include one or more processors 202 and memory (data storage) 204, GNSS module 206, communication module 208, navigation module 210, control system 212, sensor module 214, power module 216, and other mechanical and/or communication components. Communication module 208 may allow aircraft 200 to communicate with the computing device 130 or other processors in the example system 100. Communication module 208 may utilize cellular, radio frequency, near field communication, infrared, Bluetooth, Wi-Fi, satellite, or any other means for communication. Sensor module 214 of the aircraft may include one or more visual sensors, proximity sensors, and other types of sensors. aircraft 200 may also include Global Navigation Satellite System (GNSS) module 206, navigation module 210 and one or more processors 202, which may determine positioning information for aircraft 200, guide aircraft 200 navigating to the destination and conduct specific functions or data analysis. GNSS module 206 may be a GPS module. Navigation module 210 may be configured to communicate with a computing device 130 through a wireless connection (e.g., Internet) to receive data useful in navigation as well as to provide real-time position reports. Operational parameters of the aircraft 200 may include GNSS information, navigating route, battery information, navigation speed, navigation direction, motor speed, power signal, etc. Aircraft 200 may include multiple motors to drive rotation of one or more propeller blades to cause lift and propulsion for the aircraft 200. One or more of propeller blades (e.g., blades, rotary blades) may be assembled and attached to each motor. Control system 212 may be in communication with the plurality of motors and the power source such that control system 212 controls and monitors operation of the plurality of motors and the motor speed or other characteristics of the motor.

Figure 2B:
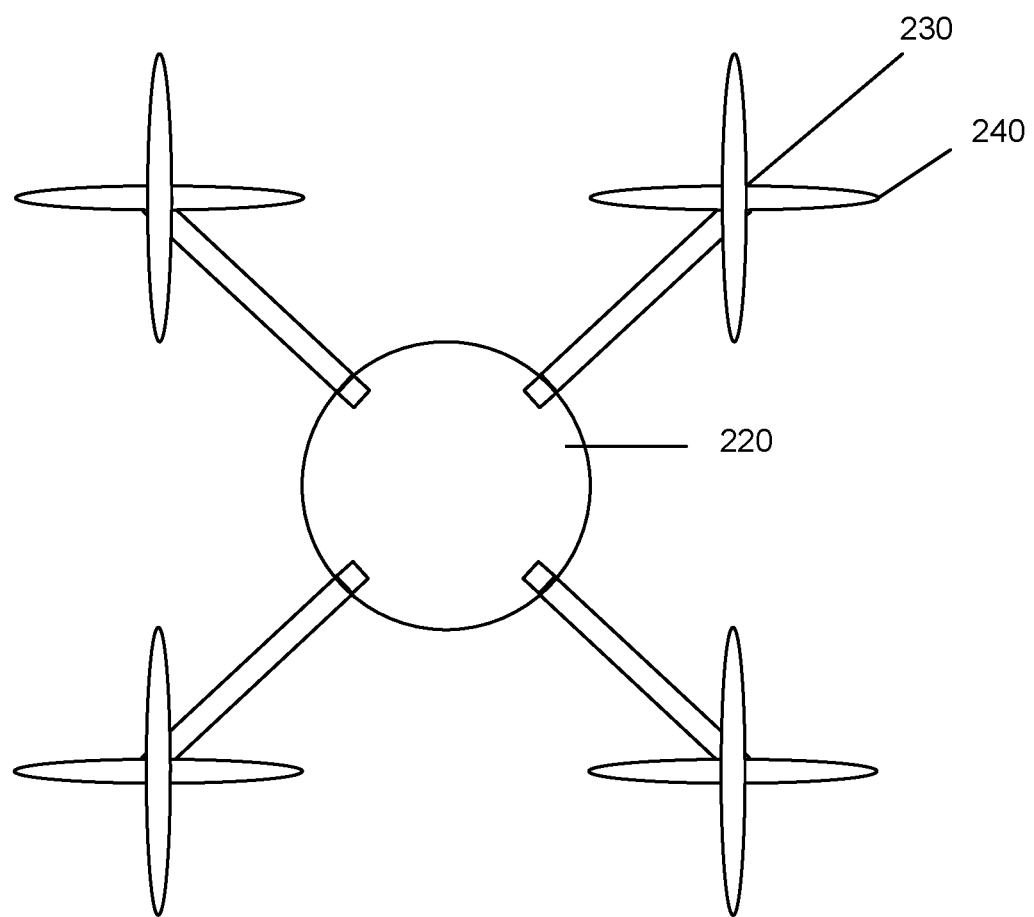
FIG. 2B is a diagram illustrating an example rotary wing aircraft with a plurality of motors and rotors according to some embodiments.

A rotary wing aircraft 200 may be applied to any type of rotary wing aircraft with multiple rotors, such as one rotor (helicopter), 3 rotors (tricopter), 4 rotors (quadcopter), 6 rotor (hexacopter), 8 rotors (octocopter), etc. The rotary wing aircraft 200 may be a multi-rotor UAV. For example, a multi-rotor UAV may be assembled to include multiple rotors, one attached to each motor and a plurality of blades may revolve around each rotor. FIG. 2B is a diagram illustrating an example rotary wing aircraft with a plurality of motors 220 and rotors 230. A plurality of blades 240 may revolve around each rotor 230. A rotor 230 may be a three-bladed rotor, a four-bladed rotor, or other number of multi-bladed rotor. For example, each motor 220 may drive a rotor 230 attached to a respective motor 220. The one or more processors 202 may be configured to apply different instructions to control each motor 220 by controlling operational parameters of the motor 220, such as a motor speed.

In some embodiments, the aircraft 200 may be registered in an aircraft management system to be associated with an aircraft profile. A plurality of aircraft of an entity may be registered in the aircraft management system to some specified characteristics and be managed to fly in a certain navigation area based on predetermined rules. The profile for a corresponding aircraft may include entity name, aircraft identity name or number, numbers of motors, numbers of rotors attached to each motor, numbers of blades of each rotor attached to each motor, portions having enhanced reflectivity coated on one or more blades, reflective material, reflection amplitudes of portions having enhanced reflectivity, an order of pulses associated with portions having different reflectivity, Doppler frequencies of the pattern of enhanced reflective portions , and/or other characteristics. Aircraft profiles associated with a plurality of aircraft of one or more known entities may be stored in database 140.

In some embodiments, at least one of plurality of blades of the aircraft 200 may include a material that is more electromagnetically reflective than a reminder of the blade. The reflective substance may be metallic material, polymers, and/or any other materials which can provide compatible resonant features to reflect electromagnetic energy sent from electromagnetic energy detecting device 110. For example, the electromagnetically reflective substance may be directly coated by painting or applying tapes, or by any other suitable ways, to one point or an area on the surface of one or more of the propeller blades of the aircraft. Alternatively, the blades can be manufactured and/or modified to embed the reflective substance and constructed with resonant structures to enhance reflected energy. In a simplest form, for example, a single blade may have an electromagnetically reflective substance applied to it on one point on the surface of one of the propeller blades of aircraft 200.

Figure 3:
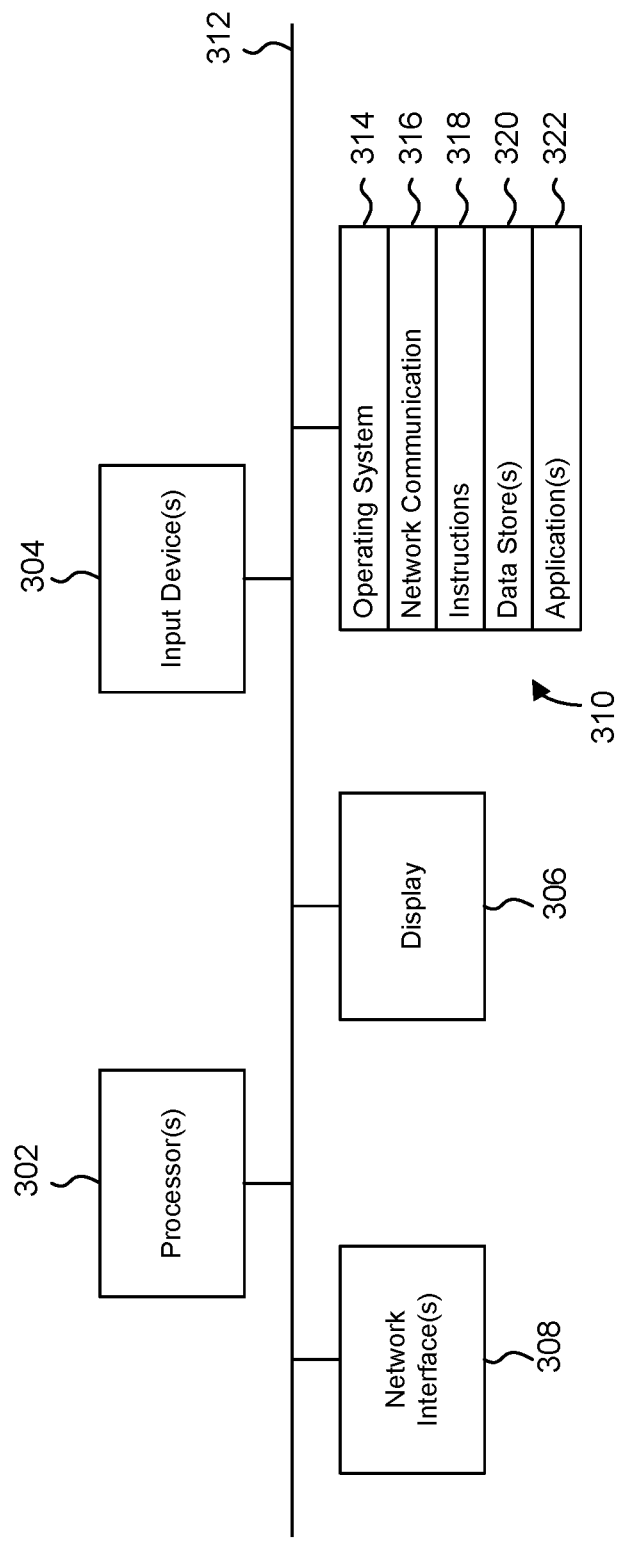
FIG. 3 is a block diagram of an example computing device according to some embodiments.

FIG. 3 is a block diagram of an example computing device 300 that may implement various features and processes as described herein. Computing device 300 may be implemented on any electronic device that runs software applications derived from instructions, including without limitation personal computers, servers, smart phones, media players, electronic tablets, game consoles, email devices, etc. In some implementations, computing device 300 may include one or more processors 302, one or more input devices 304, one or more display devices 306, one or more network interfaces 308, and one or more computer-readable mediums 310. Each of these components may be coupled by bus 312.

Display device 306 may be any known display technology, including but not limited to display devices using Liquid Crystal Display (LCD) or Light Emitting Diode (LED) technology. Processor(s) 302 may use any known processor technology, including but not limited to graphics processors and multi-core processors. Input device 304 may be any known input device technology, including but not limited to a keyboard (including a virtual keyboard), mouse, track ball, and touch-sensitive pad or display. Bus 312 may be any known internal or external bus technology, including but not limited to ISA, EISA, PCI, PCI Express, NuBus, USB, Serial ATA or FireWire. Computer-readable medium 310 may be any medium that participates in providing instructions to processor(s) 302 for execution, including without limitation, non-volatile storage media (e.g., optical disks, magnetic disks, flash drives, etc.), or volatile media (e.g., SDRAM, ROM, etc.).

Computer-readable medium 310 may include various instructions 318 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 304; sending output to display device 306; keeping track of files and directories on computer-readable medium 310; controlling peripheral devices (e.g., disk drives, printers, etc.) which can be controlled directly or through an I/0 controller; and managing traffic on bus 312. Network communications instructions 316 may establish and maintain network connections (e.g., software for implementing communication protocols, such as TCP/IP, HTTP, Ethernet, telephony, etc.).

Figure 4:
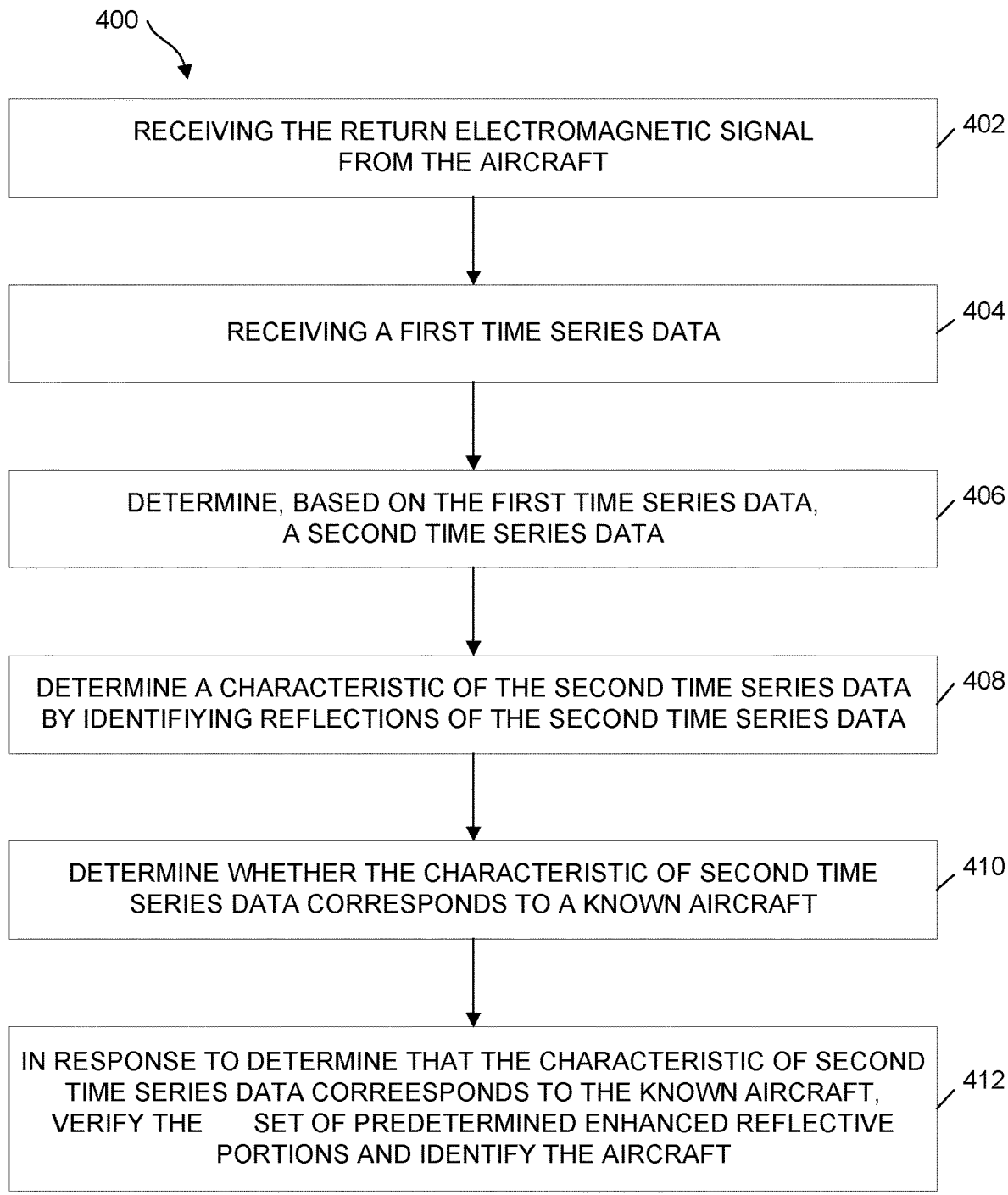
FIG. 4 is a flowchart diagram illustrating a method for detecting a rotary wing aircraft based on reflected signals in time domain according to some embodiments.

Instructions 318 may perform the various automatic production testing and/or validation functions described below. In some embodiments, system 100 may include a plurality of computing devices 300, and different computing devices 300 may perform different subsets of the automatic production testing and/or functions using different portions of instructions 318. Computer-readable medium 310 may also include one or more data stores 320 that may be used by instructions 318. FIG. 4, described in detail below, provides examples of how instructions 318 and/or data stores 320 may be configured in some embodiments.

Application(s) 322 may be an application that uses or implements the processes described herein and/or other processes. The processes may also be implemented in operating system 314. The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet. The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

The example system 100 may include a network to facilitate communications between the various devices associated with the example system 100. For example, aircraft 200 may communicate with the computing system via the network. The network may include satellite-based navigation system or a terrestrial wireless network, Wi-Fi, and other type of wired or wireless networks to facilitate communications between the various networks devices associated with the example system 100. Furthermore, the network may be a single network or a combination of networks, which may or may not all use similar communication protocols and/or techniques.

Database 140 may be coupled to computing device 130 or be accessed by computing device 130 through a network. Database 140 may store each aircraft profile of a plurality of aircraft of one or more entities. For example, database 140 may be established to store unique identifying signatures for each particular aircraft based on the predetermined signal generated by combinations of reflection areas coated or embedded on multiple blades. For example, database 140 may store location, position, relationships of the signals associated with an aircraft and aircraft profile. Computing device 130 may access database 140 to obtain predetermined signal and respective reflection amplitudes and Doppler frequencies associated with particular signals. Doppler frequencies may be related to the angular or linear velocity of the rotor with coated blades. Database 140 may store any suitable information required to implement exemplary embodiments in the present disclosure.

In the example system 100, network may include satellite-based navigation system or a terrestrial wireless network, Wi-Fi, and other type of wired or wireless networks to facilitate communications between the various networks devices associated with the example system 100.

FIG. 4 is a flowchart diagram illustrating an example process 400 for identifying an aircraft according to some embodiments of the present disclosure. The process 400 may be implemented in the above described systems and may include the following steps. The data may be processed in real-time in the following steps. Steps may be omitted, reordered or combined depending on the operations being performed.

In various embodiment, the system may include electromagnetic signal detection apparatus 110 to emit an electromagnetic signal to an aircraft navigation region. For example, aircraft from unknown or known entities may navigate in the same navigation area at the same time.

At 402, electromagnetic signal detection apparatus 110 may emit an electromagnetic signal via transceiver 111 to an aircraft navigation region. Transceiver 111 may receive a return electromagnetic signal reflected by the aircraft 120 in response to a transmission of the electromagnetic signal. Aircraft 120 may comprise a plurality of propeller blades or rotary blades attached to an aircraft motor. In the present disclosure, the plurality of aircraft associated with an entity may share one or more sets of common characteristics so as to be easily distinguished from other entities. For example, in some embodiments, at least one propeller blade of an aircraft 120 may include one or more portions having a reflectivity different from other portions associated with an entity. These portions may be related to each other with respect to the physical locations or positions on the rotor of blades. These portions may be located on the same rotary blade with the same angular velocity. Therefore, a rotation period of the portions coated on a blade equals to a revolution period of propeller blades of the aircraft 120. The transceiver 111 may use various sensors to detect operational parameters of the aircraft 120. For example, the transceiver 111 may detect a speed, a direction and a propeller rotation period of aircraft 120. The detected aircraft data may be sent to the processor 131 directly for the return signal analysis.

At 404, processor 131 may be in communication with the electromagnetic signal detection apparatus 111 and receive a first time series data indicative of the return electromagnetic signal. The first time series data includes all reflected signals from aircraft 120. The first time series data may be associated with the enhanced energy reflected by portions of different reflectivity coated on the one or more blades of the aircraft. The first time series data may also be associated with energy reflected by the normal surface of blades of the aircraft.

At 406, the processor may determine a second time series data based on the first time series data compared to a predefined normal return threshold. The second time series data may have a value deviating from a predefined normal return threshold and associated with the reflectivity portions. To distinguish the enhanced energy from the normal reflected energy, the system may establish a threshold in order to filter out the normal reflected energy and further obtain the amplitude signal only associated with energy reflected by the enhanced reflective portions. The threshold may be adjustable by processor 131 to determine clear amplitude signal or pulses caused by the reflection of the set of predetermined enhanced reflective portions.

Figure 5A:
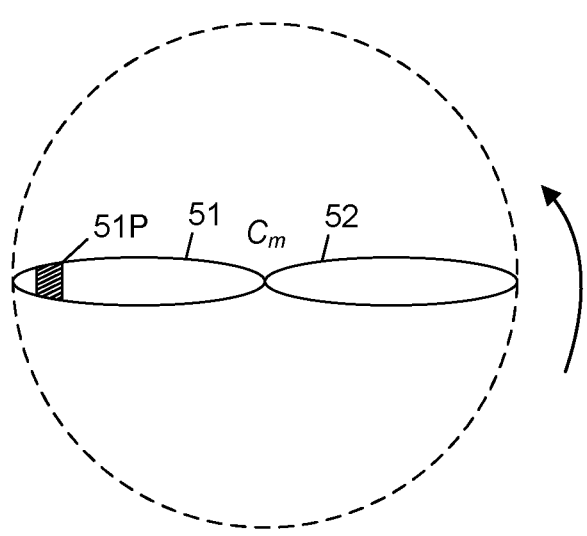
FIG. 5A is a diagram illustrating a blade of a rotary wing aircraft having a portion with a different reflectivity from other portions according to one embodiment.
Figure 5B:
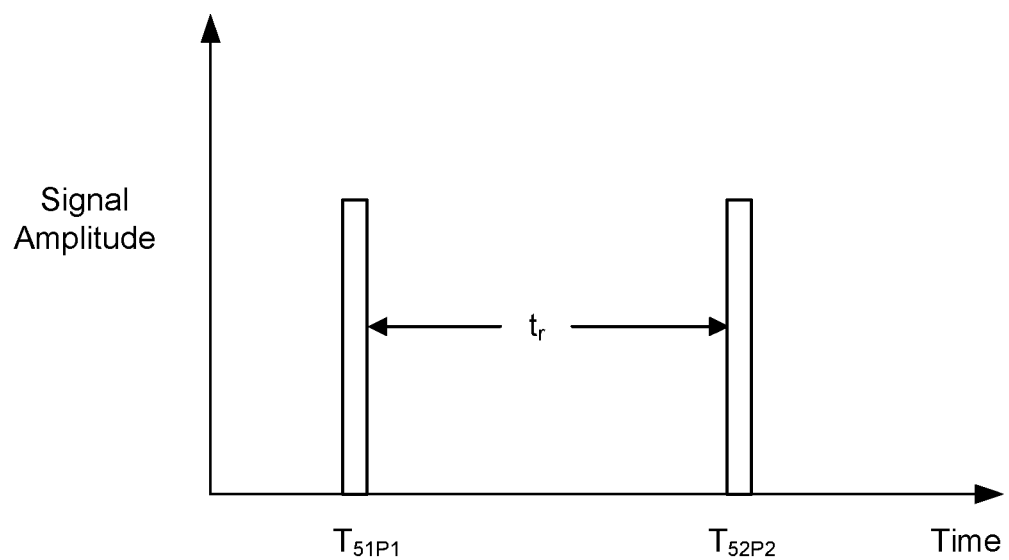
FIG. 5B is a graph of amplitude versus time illustrating a signal reflected by the blade of FIG. 5A.

Referring to FIGS. 5A-5B, for example, a motor of an aircraft 120 may include 2 blades 51 and 52 on one rotor. In one embodiment, one portion with enhanced reflectivity on one of the blades may be provided. The return signal may be represented as "10" for 2 blades 51 and 52 on one rotor of the aircraft 120. FIG. 5A is a diagram illustrating a blade of an aircraft having a portion 51P with a different reflectivity from other portions according to one embodiment. FIG. 5B is a graph of amplitude versus time illustrating a periodic signal received by transceiver 111 based on signal reflections from the blade 51 in FIG. 5A. When the aircraft 120 is navigating a region, in response to a transmission of electromagnetic signal from electromagnetic signal detection apparatus 110, a signal may be generated with periodic pulses of $T_{51P1}$ and $T_{51P2}$. When the aircraft 120 is illuminated and observed by electromagnetic signal detection apparatus 110, electromagnetic signal detection apparatus 110 may generate a signal having period pulses $T_{51P1}$ and $T_{51P2}$ which may be greater than the normal signal generated by reflections from the blade 51. A threshold with an amplitude value may be defined to filter out the portion of signal generated by reflection by the normal surface area. Therefore, the pulses of $T_{51P1}$ and $T_{51P2}$ may be generated in the continuously periodic return signal. An unknown aircraft may not have such a reflective capability and thus the known aircraft may be distinguished from unknown aircraft.

At 408, processor 131 may determine a characteristic of the second time series data by identifying reflections of the second time series data. In one embodiment, the characteristic of the second time series data may be a period within at least two propeller rotation periods of the aircraft 120. Processor 131 may determine a period of the second time series data by identifying repeated values (e.g., pulses) in the second time series data.

For example, as shown in FIG. 5B, processor 131 may determine the time period between pulses of $T_{51P1}$ and $T_{51P2}$. Processor 131 may be configured to determine a propeller revolution time $T_r$ associated with propeller blades based on a detected or pre-determined angular velocity of the propeller blade of the aircraft 120.

At 410, processor 131 may be configured to determine whether the characteristic of the second time series data corresponds to the known aircraft. For example, processor 131 may compare the revolution time $T_r$ of the blade 51 with the time period between pulses of $T_{51P1}$ and $T_{51P2}$ to determine if both values are matched. Processor 131 may determine a number of pulses corresponding to the reflective portions during one period of the second time series data. For example, if a period of a pulse or signal reflected by a propeller blade matches a revolution time $T_r$ of propeller blade of the motor, the aircraft 120 may be identified to be associated with an entity which has a predetermined pattern of enhanced reflective portions as determined by the process 400.

At 412, in response to determining that the characteristic of second time series data corresponds to the known aircraft, processor 131 may verify the set of predetermined enhanced reflective portions with reflections in a propeller rotation period of the aircraft and identify the aircraft to be associated with the entity of the known aircraft, wherein the set of predetermined enhanced reflective portions has predetermined relationships stored in a database.

Additionally, a total number of pulses within one rotation period of the aircraft may indicate a number of reflective portions coated on the blades of the aircraft. Each value or pulse of $T_{51P1}$ or $T_{51P2}$ shown in FIG. 5B may represent a reflection associated with a portion 51P. As illustrated in FIG. 5B, the processor may identify there is only one portion 51P on the aircraft blade. That is, a set of predetermined portions of the aircraft may be identified as "10" to indicate one reflective portion 51P coated on two blades. The database may store an aircraft profile and the predetermined enhanced reflective portion associated with each known aircraft.

In various embodiments which will be described below, based on an analysis of the reflected return signal in time domain, the system may identify the aircraft and distinguish it from unknown aircraft by identifying a number and timing of the reflections within one rotation period of the aircraft.

Figure 6A:
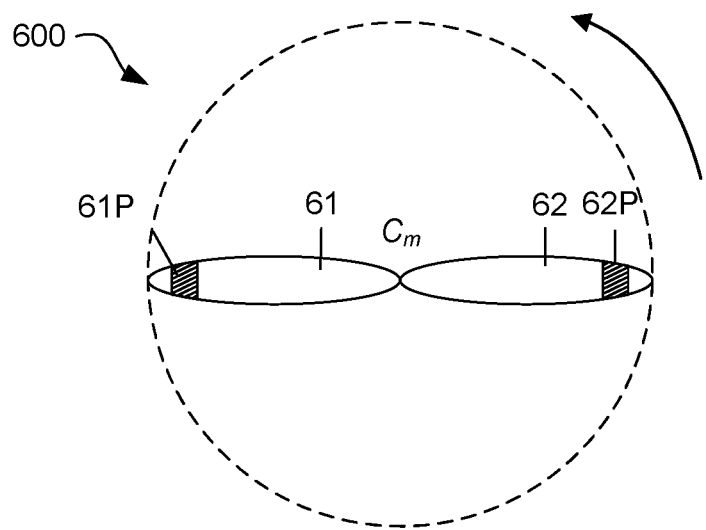
FIG. 6A is a diagram illustrating two blades including two portions each having a different reflectivity from other portions according to one embodiment.
Figure 6B:
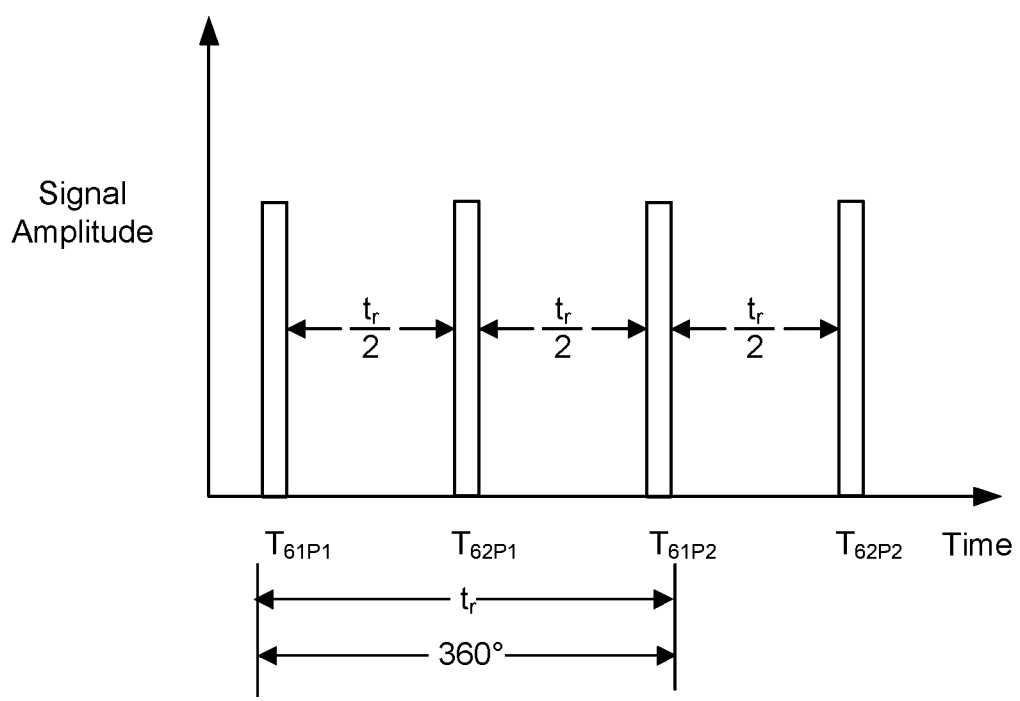
FIG. 6B is a graph of amplitude versus time illustrating a signal reflected by the blades of FIG. 6A.

Referring to FIGS. 6A-6B, the process 400 may be implemented to identify aircraft 120 which has 2 enhanced reflective portions each coated on one blade of the same rotor. FIG. 6A is a diagram illustrating two blades 61 and 62 having two portions 61P and 62P each having a different reflectivity from other portions according to one embodiment. Each enhanced reflective portion 61P and 62P may be coated on each blade 61 and 62 at same position with respect to a center Cm of the aircraft motor. When the aircraft 120 is navigating a region, in response to a transmission of electromagnetic signal from the electromagnetic signal detection apparatus 110, the enhanced reflective portions 61P and 62P as illustrated in FIG. 6A may reflect the electromagnetic signal in a return with a periodic signal including pulses of $T_{61P1}$, $T_{62P1}$, $T_{61P2}$, and $T_{62P2}$ shown in FIG. 6B. FIG. 6B is a graph of amplitude versus time illustrating a signal generated by reflective portions 61P and 62P coated on the blades 61 and 62 of FIG. 6A. When the aircraft 120 is observed by electromagnetic signal detection apparatus 110 and the reflected signal is processed by the processor, 2 pulses in the signal with enhanced energy reflected by enhanced reflective portions 61P and 62P may be obtained and greater than the energy reflected by the normal surface of the blade 61. A threshold of reflected value may be used to filter out the energy reflected by the normal surface area such that the signal associated with the enhanced reflective portions may be displayed as pulses of $T_{61P1}$, $T_{62P1}$, $T_{61P2}$, and $T_{62P2}$ in two continuously periods of the return signal in time domain. Since two enhanced reflective portions 61P and 62P are respectively coated or embedded on each blade of the same rotor with the same reflective material, when the aircraft is observed by the same sensor, two enhanced reflective portions may be observed in a periodic pulses as illustrated in FIG. 6B.

Similarly, processor 131 may be configured to determine the time period between pulses of $T_{61P1}$ and $T_{61P2}$ or a pattern contained in the pulses to obtain the second time series data. Processor 131 may be configured to determine a motor revolution time $T_r$ associated with the propeller blades based on the detected or predetermined angular velocity of the propeller blade. Therefore, a period of two pulses reflected by 2 enhanced reflective portions coated on each propeller blade is half of a revolution time of the propeller blades of the motor. The processor 131 may be configured to compare the revolution time $T_r$ of the blades with the time period between pulses of $T_{61P1}$ and $T_{61P2}$ to determine if both values are matched. If there is a match, the processor 131 may identify the aircraft 120 with the coated enhanced reflective portions 61P and 62P on both blades is associated with an entity. The processor may verify the obtained enhanced reflective portions with the stored pattern of enhanced reflective portions for a particular entity in database 140 based on an analysis of the reflected return signal in time domain.

Figure 7A:
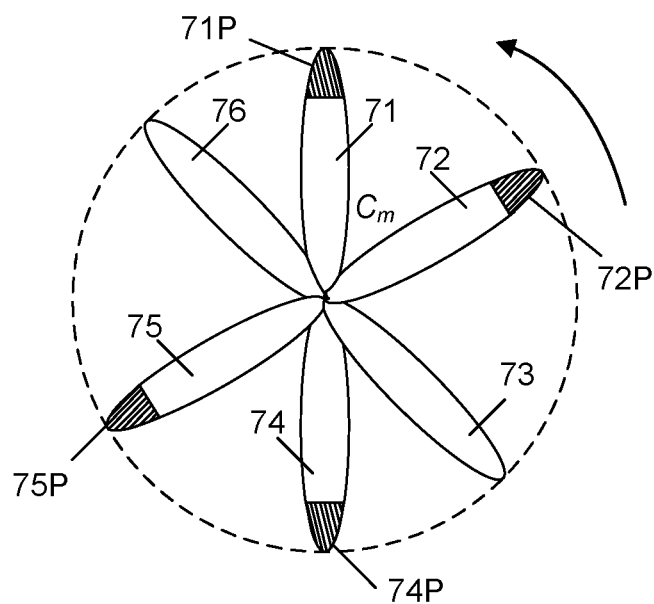
FIG. 7A is a diagram illustrating multiple blades each including a portion having a reflectivity that differs from other portions.
Figure 7B:
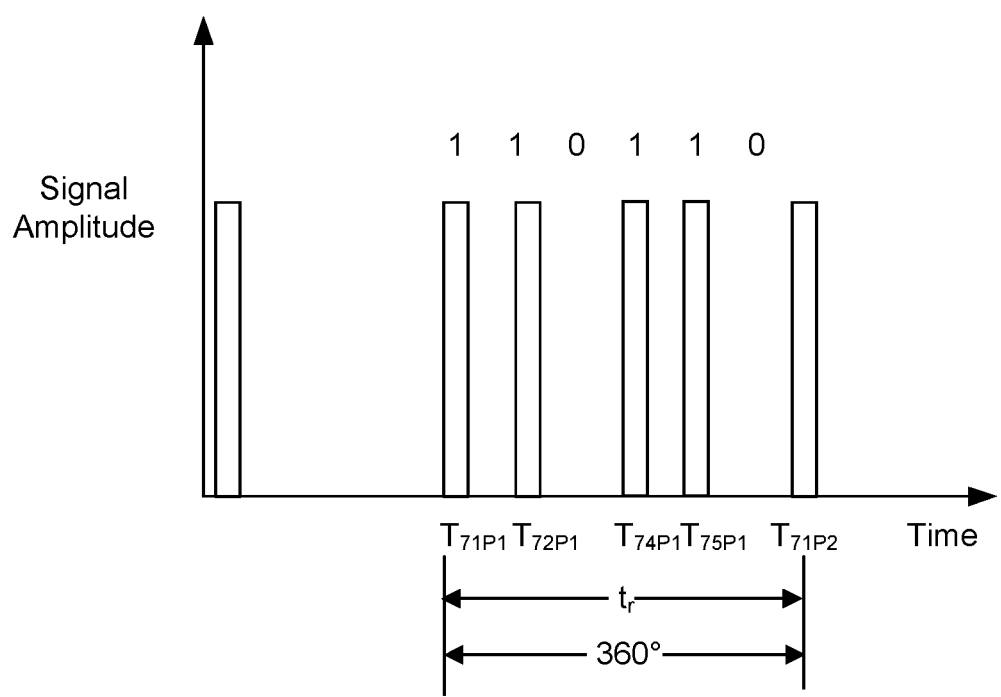
FIG. 7B is a graph of amplitude versus time illustrating a signal reflected by the blades of FIG. 7A.

Referring to FIGS. 7A-7B, the process 400 may be implemented to identify an aircraft 120 according to one embodiment. FIG. 7A is a diagram illustrating multiple blades each including a portion having a reflectivity that differs from other portions. A motor of the aircraft 200 may include 4 enhanced reflective portions 71P, 72P, 74P and 75P respectively coated on 4 blades 71, 71, 74 and 75 of the same rotor and each patterns of enhanced reflective portion may be coated on each blade at the same position with respect to a center Cm of motor. The patterns of enhanced reflective portions may be represented as "110110" as shown in FIG. 7B. When the aircraft 120 is navigating a region, in response to a transmission of electromagnetic signal from the electromagnetic signal detection apparatus 110, the enhanced reflective portions 71P, 72P, 74P, and 75P as illustrated in FIG. 7A may reflect the electromagnetic signal in a return with a periodic enhanced reflective signal including pulses $T_{71P1}$, $T_{72P1}$, $T_{74P1}$, and $T_{75P1}$. FIG. 7B is a graph of amplitude versus time illustrating a signal reflected by the blades of FIG. 7A. When the aircraft 120 is observed by electromagnetic signal detection apparatus 110 and the return signal reflected by the blades of the aircraft 120 is processed by the processor 131, 4 pulses with enhanced energy reflected by enhanced reflective portions 71P, 72P, 74P, and 75P may be greater than the energy reflected by the normal surface of the blade. A threshold of reflected value may be used to filter out the energy reflected by the normal surface area such that the signal reflected by enhanced reflective portions may be displayed as pulses of $T_{71P1}$, $T_{72P1}$, $T_{74P1}$, and $T_{75P1}$ in a period of the return signal in time domain. For example, if blades 71, 72, 74 and 75 of a 6-blade rotor are coated, the observer may see pulses at $T_{71P1}$, $T_{72P1}$ followed by a blank time slot "0", two more pulses at $T_{74P1}$ and $T_{75P1}$ and another blank time slot "0", which can be represented as a sequence of "110110". The periodic sequence may start with a pulse of $T_{71P-2}$.

Since four enhanced reflective portions 71P, 72P, 74P, and 75P are respectively coated on each blade of the rotor with the same reflective material, when the aircraft 120 is observed by the same sensor, the signal reflected by enhanced reflective portions may be observed in a periodic signal as illustrated in FIG. 7B.

Similarly, the processor 131 may be configured to determine the time period of the periodic reflected signal associated with four enhanced reflective portions 71P, 72P, 74P, and 75P. The processor 131 may be configured to compare the revolution time $T_r$ of the propeller blade with the time period to determine if both values are matched. If there is a match, the processor 131 may identify the aircraft to be associated with a particular entity stored in database 140.

As multiple rotor assemblies and propeller blades are coated a complex set of pulses or returns may be seen and if necessary de-interleaving algorithms such as those utilized by Radar Warning transceiver and other Electronic Warfare (EW) devices may have to be employed.

In some example embodiments, the concept of utilizing reflective material and appropriate sensors for detecting aircraft may be applies to any part of the electromagnetic spectrum. As described in details above, the enhanced reflective portions may be applied to a single set of blades on an aircraft. Since an aircraft may have multiple rotor/propeller assemblies each with multiple blades, the same principles can be applied to one or more rotor assembly on any given aircraft, thus multiplying the number of codes available facilitating the ability to distinguish between large numbers of aircraft.

Figure 8:
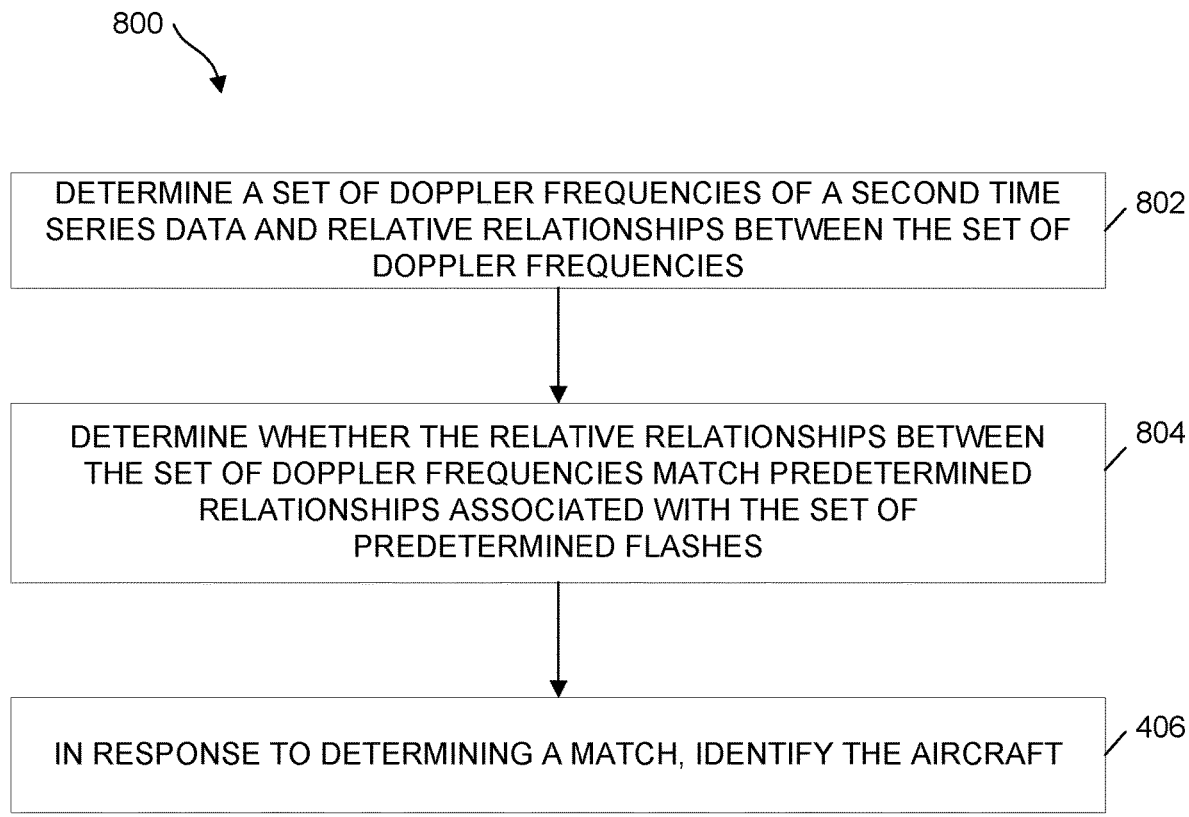
FIG. 8 is a flowchart diagram illustrating a method for detecting a rotary wing aircraft based on analyzing reflected signals in the frequency domain according to some embodiments.

FIG. 8 is a flowchart diagram illustrating a process 800 for detecting the aircraft based on analyzing reflected signals in frequency domain according to some embodiments.

The Doppler responses in frequency resulting from multiple reflecting surfaces on one blade of a rotor are mathematically related to each other based on locations of the reflective portions coated on a blade of the aircraft. The locations of the reflective portions may be relative to the distances and positions referenced to a point on the blade (e.g., the tip of the blade) or the center of the motor.

At 802, the processor may further identify the detected aircraft by determining a set of Doppler frequencies of a second time series data and relative relationships between the set of Doppler frequencies associated with the reflective portions. In various embodiments, relationships between different sets of predetermined enhanced reflective portions may be predetermined and stored in a database. For example, relationships between a set of predetermined enhanced reflective portions may include the locations of the reflecting portions relative to the distances and positions with reference to the center of the motor. Relative relationships between a set of predetermined enhanced reflective portions may be represented by a signal or an order of pulses generated based on predetermined rules. The relative relationships between Doppler responses in frequency resulting from multiple reflecting portions on one blade may be obtained based on the similar predetermined rules.

Figure 9A:
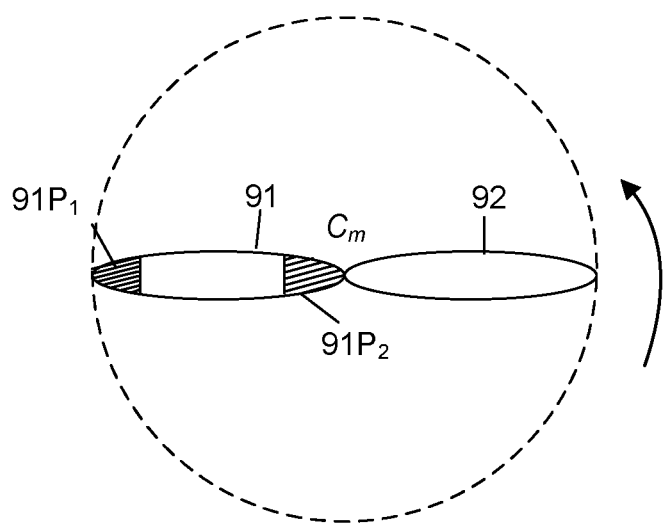
FIG. 9A is a diagram illustrating a blade having two portions having a reflectivity different from other portions according to one embodiment.
Figure 9B:
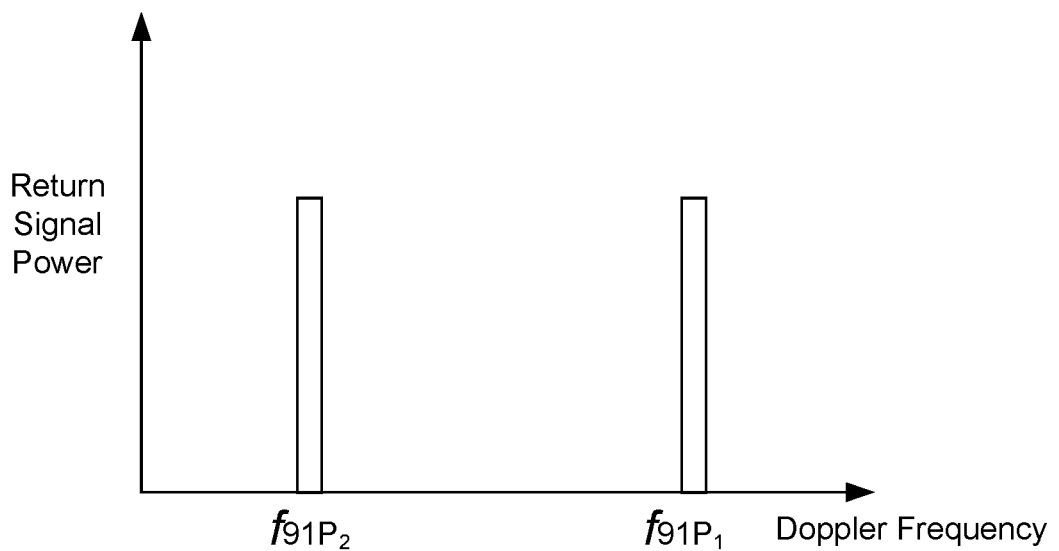
FIG. 9B is a graph of Doppler frequency versus reflected signal illustrating a signal reflected by the blade of FIG. 9A.

Referring to FIGS. 9A-9B, a motor of the aircraft 120 may have 2 enhanced reflective portions coated on one blade of the rotor. FIG. 9A is a diagram illustrating a blade having two portions having a reflectivity different from other portions according to one embodiment. A particular rotary blade may have reflective material applied at the root of the blade and also have reflective material applied to the tip of the blade. For example, as shown in FIG. 9A, an enhanced reflective portion 91P$_1$ is located at the tip of the blade and an enhanced reflective portion 91P$_2$ is located at the root of the blade with reference to a center Cm of the motor. FIG. 9B is a graph of Doppler frequency versus amplitude of return signal for illustrating a periodic reflection of two enhanced reflective portions 91P$_1$ and 91P$_2$ coated on one blade 91 according to one embodiment of FIG. 9A. Two reflective pulses $f_{91P1}$ and $f_{91P2}$ may represent two distinct Doppler frequency returns in spectrum analysis, for example, $f_{91P1}$ from the tip of the blade 91 and $f_{91P2}$ from the root of the blade 91. As shown in FIG. 9B, the number of reflective pulses of Doppler frequency returns represents a total number of enhanced reflective portions coated on one blade.

Generally, Doppler frequency can be described mathematically as Equation 1, $$f_d = 2v \frac{f_t}{c} \quad (1)$$

wherein: $f_d$ is a Doppler frequency,
$f_t$ is an original frequency of a moving target,
c is the speed of light, and
v is a target velocity.

As illustrated FIG. 9A, the tip of the blade has a much higher linear velocity than the root, a Doppler frequency $f_{91p1}$ associated with a signal reflected by enhanced reflective portion 91P$_1$ at the tip may be greater than a Doppler frequency $f_{91P2}$ associated with an enhanced reflective portion 91P$_2$ at the root.

The predetermined pattern of enhanced reflective portion may include enhanced reflective portions located on the rotor with different liner velocities. Corresponding Doppler frequencies can be defined for the predetermined pattern of enhanced reflective portions. The system may identify changes or relative relationships between the Doppler frequency returns of the return signal based on relationships of the enhanced reflective portion.

At 804, the processor may determine whether the relative relationships between the set of Doppler frequencies match predetermined relationships associated with the set of predetermined enhanced reflective portions. The processor may obtain the predetermined relationships associated with the set of predetermined enhanced reflective portions from the database.

At 806, in response to determining a match, the set of predetermined enhanced reflective portions may be verified to be associated with the aircraft and the aircraft may be identified to be associated with an entity of a known aircraft. If the relative relationships between the set of Doppler frequencies match predetermined relationships associated with the set of predetermined f enhanced reflective portions, the corresponding aircraft may be identified based on changes or relationships of the Doppler frequency returns associated with the predetermined pattern of enhanced reflective portions.

Figure 10A:
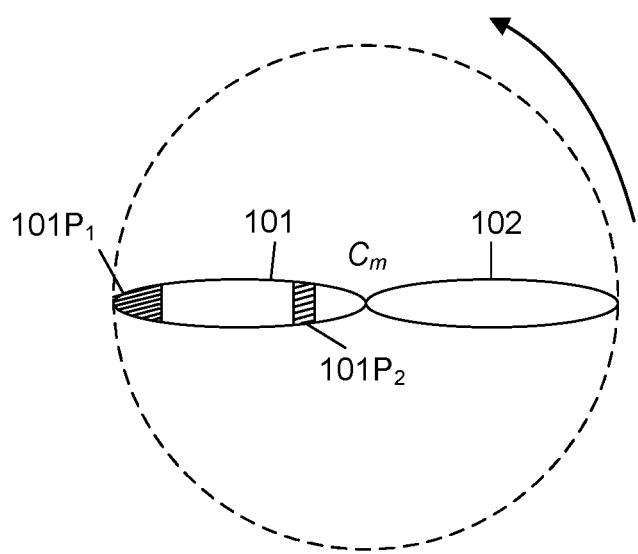
FIG. 10A is a diagram illustrating a blade having two portions with a reflectivity different from other portions according to one embodiment.
Figure 10B:
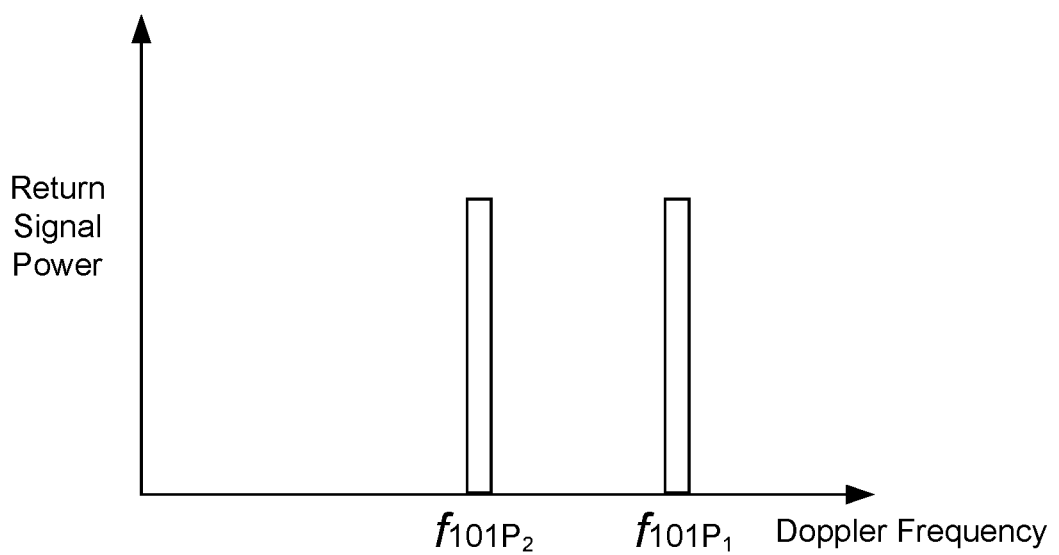
FIG. 10B is a graph of Doppler frequency versus reflected signals illustrating a signal reflected by the blade of FIG. 10A.

FIG. 10A is a diagram illustrating a blade having two portions with reflectivity different from other portions according to one embodiment. FIG. 10B is a graph of Doppler frequency versus reflected signals illustrating a signal reflected by the blade of FIG. 10A. Referring to FIG. 10A, two enhanced reflective portions 101P$_1$ and 101P$_2$ coated on one blade 101. An enhanced reflective portion 101P$_1$ is moved further away a center Cm of the motor. As shown in FIG. 10B, 2 reflective pulses $f_{101P1}$ and $f_{101P2}$ may represent 2 enhanced reflective portions 101P$_1$ and 101P$_2$ coated on one blade 101. Accordingly, changes or relationships of the Doppler returns between pulses $f_{101P1}$ and $f_{101P2}$ associated with enhanced reflective portions 101P$_1$ and 101P$_2$ may be compared with the Doppler returns shown in FIG. 9B. Therefore, the spectrum can be modified by moving the enhanced reflective portions coated with the reflective material up from the root of the blade resulting in the second Doppler return moving up in frequency because of the higher linear velocity enabling effective control of the spectral signature of the aircraft and providing another method of distinguishing one aircraft from another.

Figure 11A:
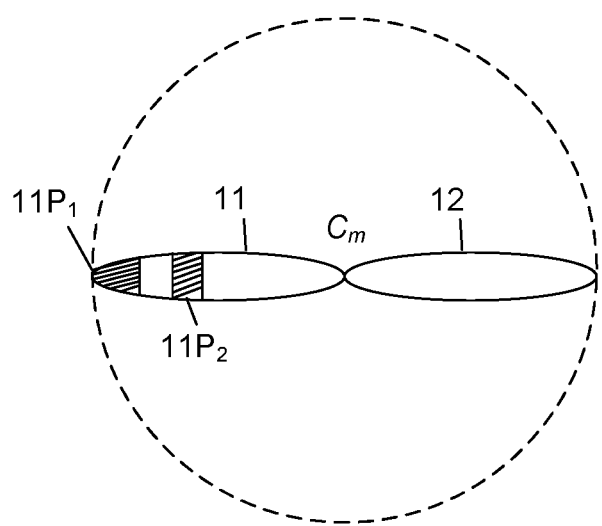
FIG. 11A is a diagram illustrating a blade having two portions with reflectivity different from other portions according to one embodiment.
Figure 11B:
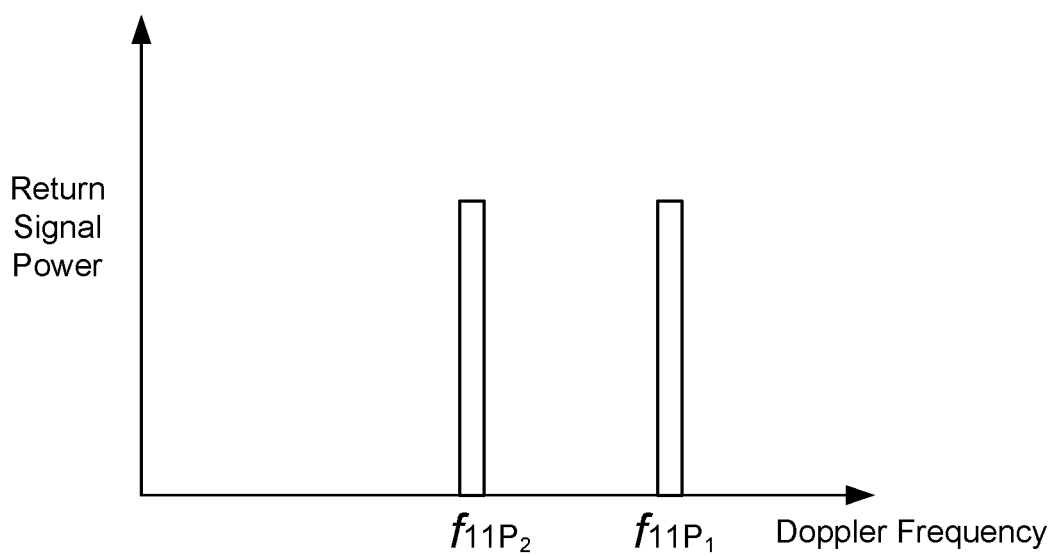
FIG. 11B is a graph of Doppler frequency versus reflected signals illustrating a signal reflected by the blade of FIG. 11A.

FIG. 11A is a diagram illustrating a blade having two portions with reflectivity different from other portions according to one embodiment. FIG. 11B is a graph of Doppler frequency versus reflected signals illustrating a signal reflected by the blade of FIG. 11A. As shown in FIG. 11B, 2 reflective pulses represents 2 enhanced reflective portions 11P$_1$ and 11P$_2$ coated on one blade 11. Referring to FIG. 11A, an enhanced reflective portion 11P$_2$ is moved much further away a center Cm of the motor. Accordingly, a difference between the Doppler returns $f_{11P1}$ and $f_{11P2}$ associated with two enhanced reflective portions 11P$_1$ and 11P$_2$ is decreased compared with the Doppler returns shown in FIG. 9B and FIG. 10B.

Figure 12A:
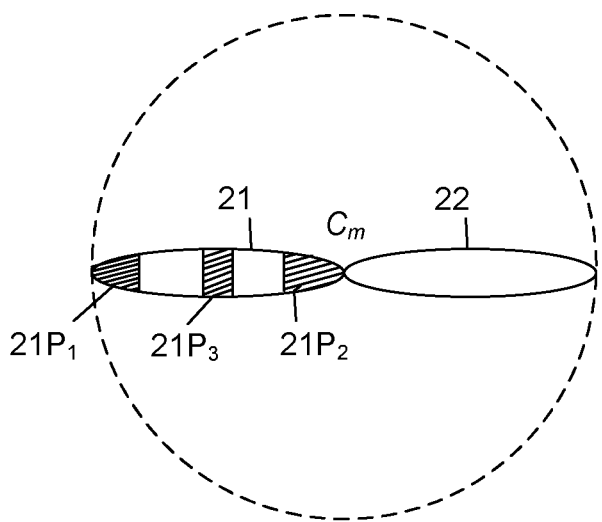
FIG. 12A is a diagram illustrating a blade having three portions with reflectivity different from other portions according to one embodiment.
Figure 12B:
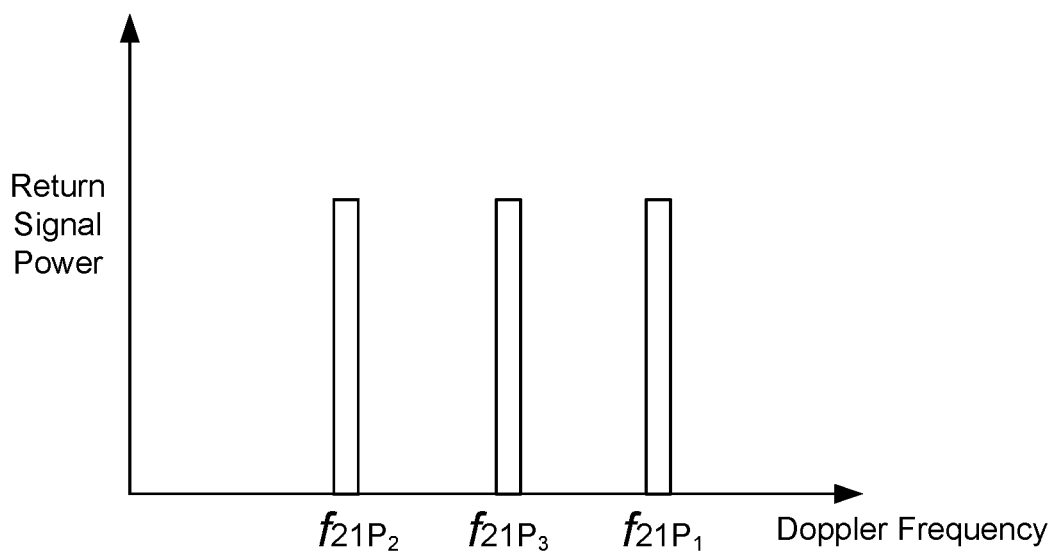
FIG. 12B is a graph of Doppler frequency versus reflected signals illustrating a signal reflected by the blade of FIG. 12A.

FIG. 12A is a diagram illustrating a blade having three portions with reflectivity different from other portions according to one embodiment. FIG. 12B is a graph of Doppler frequency versus reflected signals illustrating a signal reflected by the blade of FIG. 12A. Referring to FIGS. 12A-12B, three enhanced reflective portions $21P_1$, $21P_3$ and $21P_2$ are coated or embedded on a single blade 21 of a rotor of the aircraft motor with respect to a center Cm of the motor. If a third reflecting surface was introduced at the mid-point of the blade, the mid-point reflective portion returns a Doppler response $f_{21P3}$. The root reflective portion of the propeller blade may return a Doppler response $f_{21P2}$. The tip reflective portion of the propeller blade may return a Doppler response $f_{21P2}$. Because the mid-point of the blade has a linear velocity greater than the root of the propeller blade and the tip of the propeller blade has a linear velocity greater than the mid-point of the blade, a Doppler frequency response of the reflective signal may be shown in FIG. 12B, where $f_{21P1} > f_{21P3} > f_{21P2}$. The differences between the Doppler frequencies associated with the sequence of enhanced reflective portions arranged on the blade may correspond to the relative relationship of distances between the enhanced reflective portions.

Figure 13A:
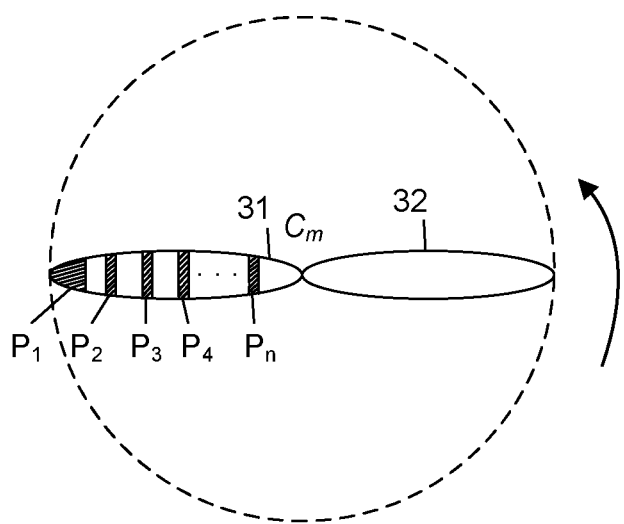
FIG. 13A is a diagram illustrating a blade having multiple portions with reflectivity different from other portions according to one embodiment.
Figure 13B:
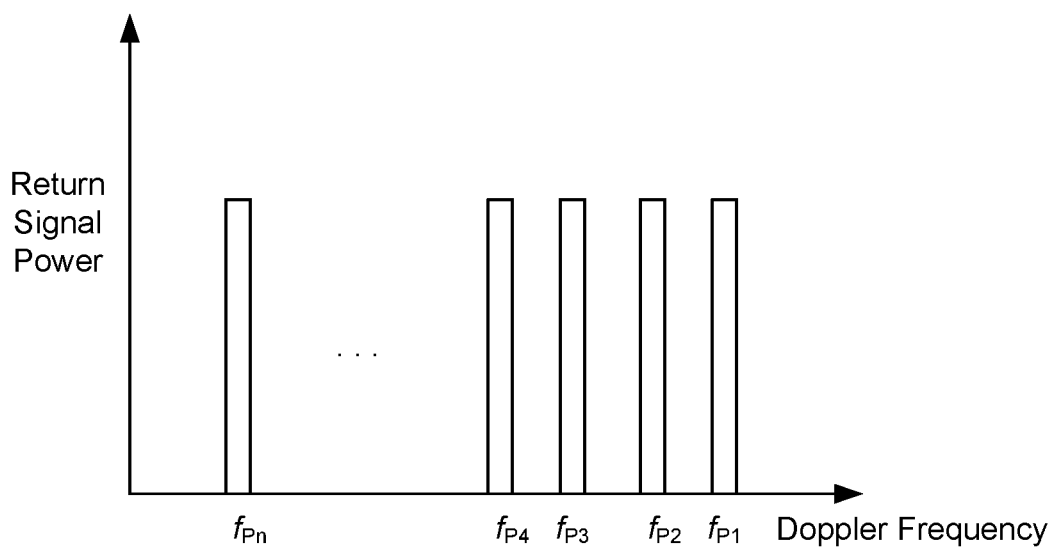
FIG. 13B is a graph of Doppler frequency versus reflected signals illustrating a signal reflected by the blade of FIG. 13A.

FIG. 13A is a diagram illustrating two blades 31 and 32 with a blade 31 having multiple portions $P_1, P_2, \ldots P_n$ with reflectivity different from other portions according to one embodiment. FIG. 13B is a graph of Doppler frequency versus reflected signals illustrating a signal reflected by the blade 31 of FIG. 13A. Referring to FIGS. 13A-13B, the concept can be extended to n reflective portions coated on a blade with the only limit being the Doppler resolution. For example, n reflective portions $P_1, P_2, \ldots P_n$ coated on a blade 31 may be represented as a set of predetermined enhanced reflective portions stored in the database. The corresponding Doppler frequencies to $f_{P1}, f_{P2}, f_{P3}, f_{P4} \ldots f_{Pn}$ are associated with the sequence of enhanced reflective portions $P_1, P_2, \ldots P_n$ arranged on the blade 31.

By applying multiple reflecting portions on a blade, thereby causing the spectrum return to have the same number of multiple Doppler frequency returns, embodiments of the present disclosure may provide a solution to identify a particular aircraft not only by the number and timing of the reflections but by the number of distinct Doppler returns observed and by their relative positions in the spectrum of the returned signal.

By controlling and/or enabling multiple Doppler returns, distinct reflective portions can be set up for aircraft of an entity and the corresponding Doppler frequency returns can be used to identify known aircraft and distinguish them from unknown aircraft.

As described above in details, utilizing the reflecting material coated on different portions of one of more blade of an aircraft, its subsequent pattern of enhanced reflective portions may provide the system an ability to distinguish between aircraft associated with an entity and those associated with others by analyzing reflected signals in both time and frequency domain.

In order to make the coding techniques easier to implement, it is disclosed that known aircraft may be supplied with "propeller kits" that have sets of pre-established reflective patterns so that new patterns of reflective portions can be established quickly and easily for one or more aircraft associated with an entity. The corresponding characteristics associated with a particular patterns of reflective portions can be established based on code relationship such as distance to the center of motor and position on the blade. A specific model may be established for a per-determined pattern of enhanced reflective portions with an aircraft to include the relationship between the enhanced reflective portions, time and frequency characteristics, and aircraft characteristics, and etc. The sets of pre-established reflective patterns and corresponding relationship between the reflective enhanced reflective portions or patterns may be predetermined and stored in the database.

Figure 14A:
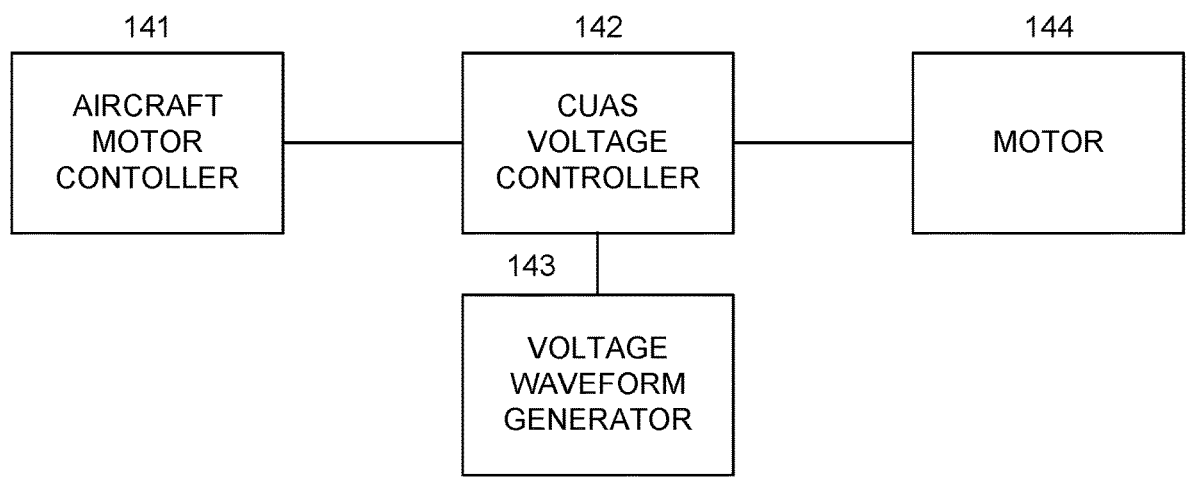
FIG. 14A is a block diagram illustrating an example power modulation suitable for detecting the rotary wing aircraft by the detection apparatus according to one embodiment.

FIG. 14A is a block diagram illustrating an example motor power control system suitable for controlling changes of aircraft power waveforms according to one embodiment.

In one embodiment, the system may enable distinction of an aircraft associated with an entity from other unknown aircraft by utilizing a device that controls the voltage to an aircraft motor and program it to change voltage in a selectable pre-programmed waveform such as a sine wave, sawtooth, triangular wave, etc. In one embodiment, control system 212 of an aircraft 200 may be in communication with the plurality of motors and the power source to control operation of the plurality of motors and monitor the power source.

Figure 14B:
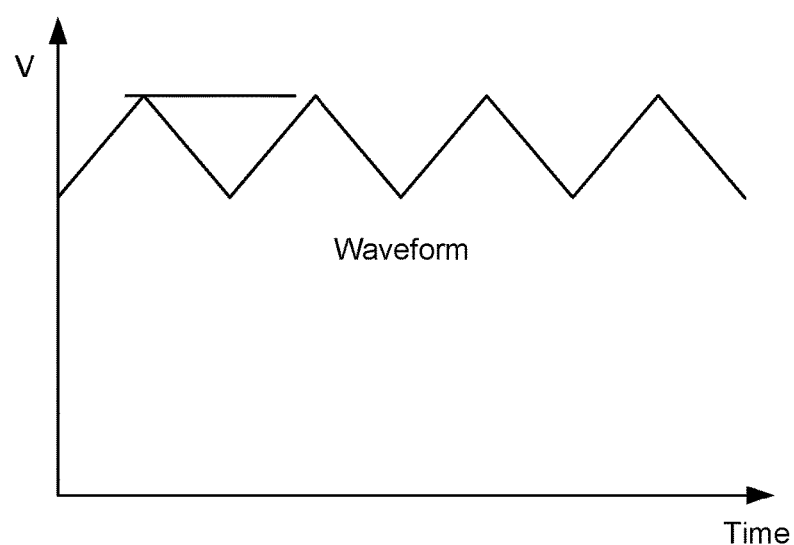
FIG. 14B is a graph of motor voltage verses time for illustrating a modulated motor voltage according to one embodiment.

By referring to FIG. 14A, an aircraft motor power control system may include aircraft motor controller 141, voltage controller 142, voltage waveform generator 143 and motor 144. The aircraft motor controller 141 may be included in the aircraft control system 212. Voltage waveform generator 143 may generate a regular motor voltage to the motor 144. An aircraft motor controller 141 may be configured to module a regular motor voltage with selectable pre-programmed waveform which may be one of sine wave, sawtooth, triangular. For example, FIG. 14B shows a selectable pre-programmed waveform according to one embodiment. The modification may be conducted so that the changes to the motor voltage are too slight to interfere with flight characteristic of the aircraft. Meanwhile, the modified motor voltage at the same time is enough to be detected by an electromagnetic sensor monitoring the reflected energy from the aircraft.

Figure 14C:
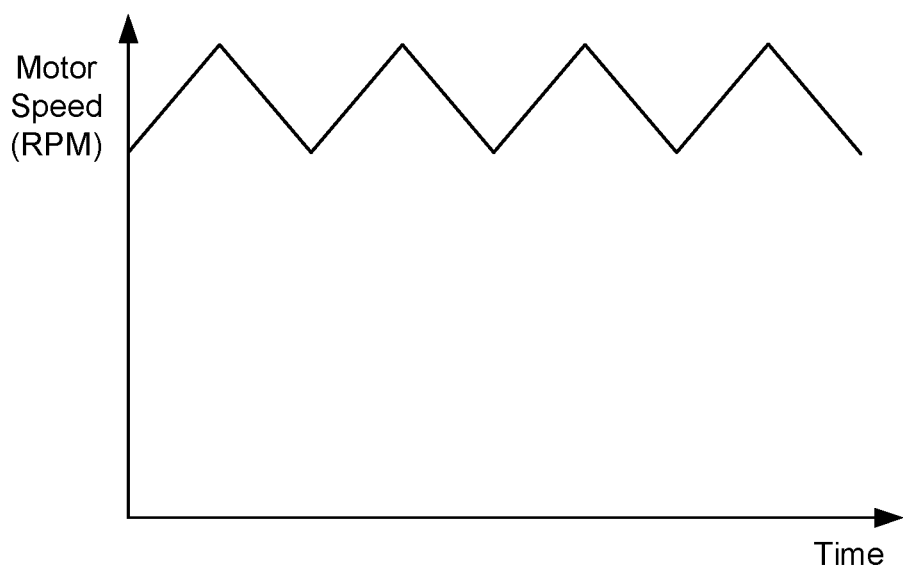
FIG. 14C is a graph of motor speed change verses time for illustrating a modulated motor voltage change according to one embodiment.
Figure 14D:
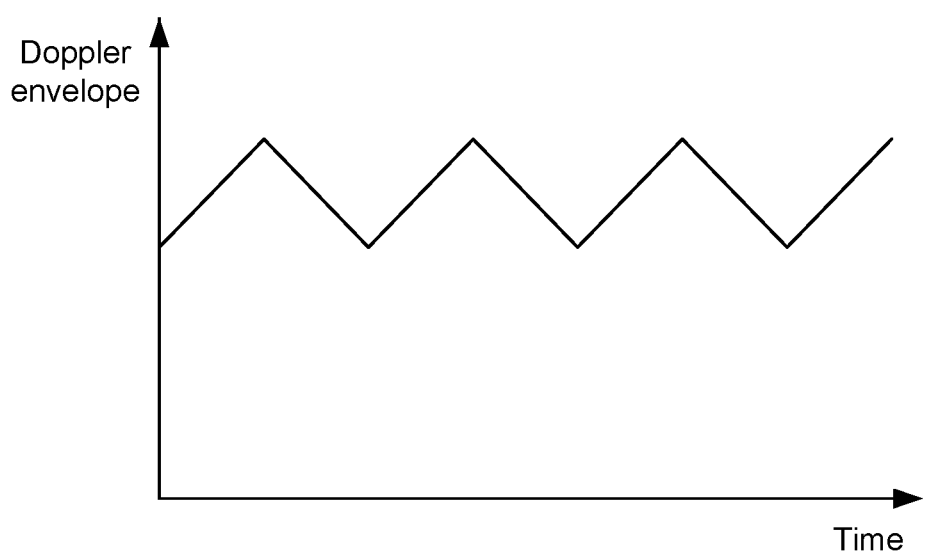
FIG. 14D is a graph of Doppler envelop of motor voltage verses time for illustrating a modulated motor voltage according to one embodiment.

FIG. 14C is a graph of motor speed verses time for illustrating a modulated motor voltage according to one embodiment. FIG. 14D is a graph of Doppler envelops of motor voltage verses time for illustrating an envelope of a modulated motor voltage according to one embodiment. The processor 131 may detect a plurality of Doppler envelopes of the return electromagnetic signal reflected by the aircraft 120. The processor 131 may determine whether the plurality of the Doppler envelops of the return electromagnetic signal has a same envelop as the modulated motor voltage. The information of pre-selected modulation conducted for an aircraft may be stored in an aircraft profile in the database. In response to determining that the plurality of the envelops of the return electromagnetic signal has a same envelop as the modulated motor voltage, the processor may identify the aircraft to be associated with an entity.

By employing multiple or various waveforms, the system may detect whether the envelop of the return signal matches with a pre-selected modulating waveform for a particular aircraft or a group of aircraft. The system may detect the envelope of the returned signal to distinguish an aircraft of an entity from the unknown aircraft.

By referring to FIG. 2B, the processor 202 of the aircraft 200 may apply different instructions to control respective speed of each motor 220 in order to independently adjust the speed of each of the rotors 230 attached to the respective motor 220. Therefore, different rotors may be controlled to selectively operate at a different speed. The different speeds may create different patterns in signals reflected by the plural rotors.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. A system for identifying a rotary wing aircraft, comprising:
an electromagnetic signal detection apparatus, the apparatus comprising:
a receiver configured to receive a return electromagnetic signal reflected by the rotary wing aircraft in response to a transmission of the electromagnetic signal,
wherein the rotary wing aircraft comprises a plurality of propeller blades attached to at least one motor, at least one propeller blade attached to one rotor and having at least one portion with a reflectivity different from other portions; and
a processor in communication with the electromagnetic signal detection apparatus and configured to:
receive a first time series data indicative of the return electromagnetic signal;
form a second time series data from the first time series data by extracting only a portion of the first time series data having a value deviating from a predefined normal return threshold;
identify reflections of the second time series data within at least two propeller rotation periods of the rotary wing aircraft in order to determine a characteristic of the second time series data;
determine that the characteristic of the second time series data corresponds to the known rotary wing aircraft by a process comprising:
determining a set of Doppler frequencies of a second time series data and difference relationships between the set of Doppler frequencies;
determining whether the relative relationships between the set of Doppler frequencies match predetermined relationships associated with the set of predetermined enhanced reflective portions; and
in response to determining that the characteristic of the second time series data corresponds to the known rotary wing aircraft, verify a set of predetermined enhanced reflective portions with reflections in a propeller rotation period of the rotary wing aircraft and identify the rotary wing aircraft to be associated with the entity of the known rotary wing aircraft, wherein the set of predetermined enhanced reflective portions has predetermined relationships stored in a database.

2. The system of claim 1, wherein the receiver further comprises at least one sensor configured to detect a speed, a direction and a propeller rotation period of the rotary wing aircraft.

3. The system of claim 1, wherein the rotary wing aircraft of the entity has the motor power modulated with a predetermined waveform.

4. The system of claim 3, wherein the predetermined waveform comprises one of sine wave, saw tooth, and triangular wave.

5. The system of claim 1, wherein the rotary wing aircraft comprises a plurality of motors and a plurality of rotors attached to the motors.

6. The system of claim 5, wherein at least one blade of each of the plurality of rotors has at least one portion with a reflectivity different from other portions.

7. The system of claim 1, wherein the processor is configured to instruct the rotary wing aircraft to change a motor speed of the rotary wing aircraft through a network.

8. The system of claim 7, wherein the processor is configured to:
receive a detecting of a motor speed change by at least one sensor of the electromagnetic signal detection apparatus; and
verify a motor speed change to identify the rotary wing aircraft to be associated with the entity of the known rotary wing aircraft.

9. The system of claim 5, wherein the processor is configured to selectively adjust repetitive speed of one or more rotors by changing respective speed of the respective motor.

10. The system of claim 1, wherein the electromagnetic signal detection apparatus is a LIDAR radar or a Doppler radar.

11. The system of claim 1, wherein rotary wing aircraft is an unmanned aerial vehicle (UAV).

12. A method for identifying a rotary wing aircraft, the method comprising:
receiving a return electromagnetic signal reflected by the rotary wing aircraft through an electromagnetic signal detection apparatus, wherein the rotary wing aircraft comprises a plurality of propeller blades attached to at least one motor, at least one propeller blade attached to one rotor and having at least one portion with a reflectivity different from other portions;
receiving, by a processor in communication with the electromagnetic signal detection apparatus, a first time series data indicative of the return electromagnetic signal, the processor is further configured to perform at least the following:
forming a second time series data from the first time series data by extracting only a portion of the first time series data having a value deviating from a predefined normal return threshold;
identifying reflections of the second time series data within at least two propeller rotation periods of the rotary wing aircraft in order to determine a characteristic of the second time series data;
determining that the characteristic of the second time series data corresponds to the known rotary wing aircraft by a process comprising:
determining a set of Doppler frequencies of a second time series data and difference relationships between the set of Doppler frequencies;
determining whether the relative relationships between the set of Doppler frequencies match predetermined relationships associated with the set of predetermined enhanced reflective portions; and
in response to determining that the characteristic of the second time series data corresponds to the known rotary wing aircraft, verifying a set of predetermined enhanced reflective portions with reflections in a propeller rotation period of the rotary wing aircraft and identifying the rotary wing aircraft to be associated with the entity of the known rotary wing aircraft, wherein the set of predetermined enhanced reflective portions has predetermined relationships stored in a database.

13. The method of claim 12, further comprising detecting, by a receiver having at least one sensor, a speed, direction and a propeller rotation period of the rotary wing aircraft; the receiver further comprises at least one sensor configured to detect a speed, a direction and a propeller rotation period of the rotary wing aircraft.

14. The method of claim 12, wherein the rotary wing aircraft comprises a plurality of motors and a plurality of rotors attached to the motors.

15. The method of claim 14, wherein at least one blade of each of the plurality of rotors has at least one portion with a reflectivity different from other portions.

16. The method of claim 12, wherein the rotary wing aircraft of the entity has the motor power modulated with a predetermined waveform.

17. The method of claim 16, wherein the predetermined waveform comprises one of sine wave, saw tooth, and triangular wave.

18. The method of claim 12, wherein identifying the rotary wing aircraft further comprises:
instructing the rotary wing aircraft to change a motor speed of the rotary wing aircraft through a network.

19. The method of claim 12, wherein identifying the rotary wing aircraft further comprises:
receiving a detecting of a motor speed change by at least one sensor of the electromagnetic signal detection apparatus; and
verifying a motor speed change to identify the rotary wing aircraft to be associated with the entity of the known rotary wing aircraft.

20. The method of claim 12, wherein the processor is configured to selectively adjust repetitive speed of one or more rotors by changing respective speed of the respective motor.

21. The method of claim 12, wherein the electromagnetic signal detection apparatus is a LIDAR radar or a Doppler radar.

22. The method of claim 12, wherein the rotary wing aircraft is an unmanned aerial vehicle (UAV).

23. A system for identifying a rotary wing aircraft, comprising:
an electromagnetic signal detection apparatus, the apparatus comprising:
a receiver configured to receive a return electromagnetic signal reflected by the rotary wing aircraft in response to a transmission of the electromagnetic signal,
wherein the rotary wing aircraft comprises a plurality of propeller blades attached to at least one motor, at least one propeller blade attached to one rotor and having at least one portion with a reflectivity different from other portions; and
a processor in communication with the electromagnetic signal detection apparatus and configured to:
receive a first time series data indicative of the return electromagnetic signal;
form a second time series data from the first time series data by extracting only a portion of the first time series data having a value deviating from a predefined normal return threshold;
determine a characteristic of the second time series data; and
determine that the characteristic of the second time series data corresponds to the known rotary wing aircraft by a process comprising:
detecting a plurality of Doppler envelopes of the return electromagnetic signal reflected by the rotary wing aircraft;
determining that the plurality of the Doppler envelops of the return electromagnetic signal has a same envelop; and
in response to determining that the plurality of the envelops of the return electromagnetic signal has a same envelop, identifying the rotary wing aircraft to be associated with the entity of the known rotary wing aircraft.

24. The system of claim 23, wherein the receiver further comprises at least one sensor configured to detect a speed, a direction and a propeller rotation period of the rotary wing aircraft.

25. The system of claim 23, wherein the rotary wing aircraft of the entity has the motor power modulated with a predetermined waveform.

26. The system of claim 25, wherein the predetermined waveform comprises one of sine wave, saw tooth, and triangular wave.

27. The system of claim 23, wherein the rotary wing aircraft comprises a plurality of motors and a plurality of rotors attached to the motors.

28. The system of claim 27, wherein at least one blade of each of the plurality of rotors has at least one portion with a reflectivity different from other portions.

29. The system of claim 23, wherein the processor is configured to instruct the rotary wing aircraft to change a motor speed of the rotary wing aircraft through a network.

30. The system of claim 29, wherein the processor is configured to:
receive a detecting of a motor speed change by at least one sensor of the electromagnetic signal detection apparatus; and
verify a motor speed change to identify the rotary wing aircraft to be associated with the entity of the known rotary wing aircraft.

31. The system of claim 27, wherein the processor is configured to selectively adjust repetitive speed of one or more rotors by changing respective speed of the respective motor.

32. The system of claim 23, wherein the electromagnetic signal detection apparatus is a LIDAR radar or a Doppler radar.

33. The system of claim 23, wherein rotary wing aircraft is an unmanned aerial vehicle (UAV).

34. A method for identifying a rotary wing aircraft, the method comprising:
receiving a return electromagnetic signal reflected by the rotary wing aircraft through an electromagnetic signal detection apparatus, wherein the rotary wing aircraft comprises a plurality of propeller blades attached to at least one motor, at least one propeller blade attached to one rotor and having at least one portion with a reflectivity different from other portions;
receiving, by a processor in communication with the electromagnetic signal detection apparatus, a first time series data indicative of the return electromagnetic signal, the processor is further configured to perform at least the following:
forming a second time series data from the first time series data by extracting only a portion of the first time series data having a value deviating from a predefined normal return threshold;
determining a characteristic of the second time series data; and
determining whether the characteristic of the second time series data corresponds to the known rotary wing aircraft by a process comprising:

detecting a plurality of Doppler envelopes of the return electromagnetic signal reflected by the rotary wing aircraft;

determining that the plurality of the Doppler envelops of the return electromagnetic signal has a same envelop; and in response to determining that the plurality of the envelops of the return electromagnetic signal has a same envelop, identifying the rotary wing aircraft to be associated with the entity of the known rotary wing aircraft.

35. The method of claim 34, further comprising detecting, by a receiver having at least one sensor, a speed, direction and a propeller rotation period of the rotary wing aircraft; the receiver further comprises at least one sensor configured to detect a speed, a direction and a propeller rotation period of the rotary wing aircraft.

36. The method of claim 34, wherein the rotary wing aircraft comprises a plurality of motors and a plurality of rotors attached to the motors.

37. The method of claim 36, wherein at least one blade of each of the plurality of rotors has at least one portion with a reflectivity different from other portions.

38. The method of claim 34, wherein the rotary wing aircraft of the entity has the motor power modulated with a predetermined waveform.

39. The method of claim 38, wherein the predetermined waveform comprises one of sine wave, saw tooth, and triangular wave.

40. The method of claim 34, wherein identifying the rotary wing aircraft further comprises:

instructing the rotary wing aircraft to change a motor speed of the rotary wing aircraft through a network.

41. The method of claim 40, wherein identifying the rotary wing aircraft further comprises:

receiving a detecting of a motor speed change by at least one sensor of the electromagnetic signal detection apparatus; and verifying a motor speed change to identify the rotary wing aircraft to be associated with the entity of the known rotary wing aircraft.

42. The method of claim 34, wherein the processor is configured to selectively adjust repetitive speed of one or more rotors by changing respective speed of the respective motor.

43. The method of claim 34, wherein the electromagnetic signal detection apparatus is a LIDAR radar or a Doppler radar.

44. The method of claim 34, wherein the rotary wing aircraft is an unmanned aerial vehicle (UAV).

* * * * *